United States Patent
Fujita

(10) Patent No.: US 10,585,435 B2
(45) Date of Patent: Mar. 10, 2020

(54) TRAVEL ROUTE CALCULATION DEVICE

(71) Applicant: Nissan Motor Co., Ltd., Yokohama-shi, Kanagawa (JP)

(72) Inventor: Susumu Fujita, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/520,313

(22) PCT Filed: Oct. 22, 2014

(86) PCT No.: PCT/JP2014/078124
§ 371 (c)(1),
(2) Date: Apr. 19, 2017

(87) PCT Pub. No.: WO2016/063384
PCT Pub. Date: Apr. 28, 2016

(65) Prior Publication Data
US 2017/0322557 A1 Nov. 9, 2017

(51) Int. Cl.
*G05D 1/00* (2006.01)
*G05D 1/02* (2020.01)
*G01C 21/34* (2006.01)

(52) U.S. Cl.
CPC ....... *G05D 1/0214* (2013.01); *G01C 21/3461* (2013.01); *G05D 1/0088* (2013.01);
(Continued)

(58) Field of Classification Search
CPC .. G05D 1/0214; G05D 1/0088; G05D 1/0223; G05D 1/0274; G05D 2201/0213; G01C 21/3461; B60W 30/0956
(Continued)

(56) References Cited

U.S. PATENT DOCUMENTS

2011/0190972 A1* 8/2011 Timmons ............... G01C 21/34
701/31.4
2012/0083960 A1* 4/2012 Zhu ......................... G06T 7/223
701/23
(Continued)

FOREIGN PATENT DOCUMENTS

CN 103781685 A 5/2014
JP 2008157820 A 7/2008
(Continued)

*Primary Examiner* — Kira Nguyen
(74) *Attorney, Agent, or Firm* — Young Basile Hanlon & MacFarlane, P.C.

(57) ABSTRACT

The travel route calculation device includes a travel route calculation unit configured to calculate a travel route for a subject vehicle to arrive at a destination, a feature detection unit configured to detect a feature, and a distance measurement unit configured to measure a distance from the subject vehicle to the feature as a necessary recognition distance. The necessary recognition distance is necessary for the subject vehicle to recognize the feature when deciding an action of the subject vehicle. The travel route calculation device further includes a determination unit configured to determine difficulty in recognizing the feature, on the basis of a detection range of the feature detection unit and the necessary recognition distance. The travel route calculation unit calculates the travel route while avoiding a location at which recognition of the feature is determined to be difficult by the determination unit.

15 Claims, 9 Drawing Sheets

(52) U.S. Cl.
CPC ......... *G05D 1/0223* (2013.01); *G05D 1/0274* (2013.01); *G05D 2201/0213* (2013.01)

(58) Field of Classification Search
USPC .......................................................... 701/26
See application file for complete search history.

(56) References Cited

U.S. PATENT DOCUMENTS

| | | | | |
|---|---|---|---|---|
| 2014/0222278 A1 | 8/2014 | Fujita | | |
| 2014/0244151 A1* | 8/2014 | Matsubara | ............. | G08G 1/165 701/301 |
| 2015/0346724 A1* | 12/2015 | Jones | ................... | B60W 30/12 701/23 |

FOREIGN PATENT DOCUMENTS

| | | |
|---|---|---|
| JP | 2012247315 A | 12/2012 |
| JP | 2013083498 A | 5/2013 |

* cited by examiner

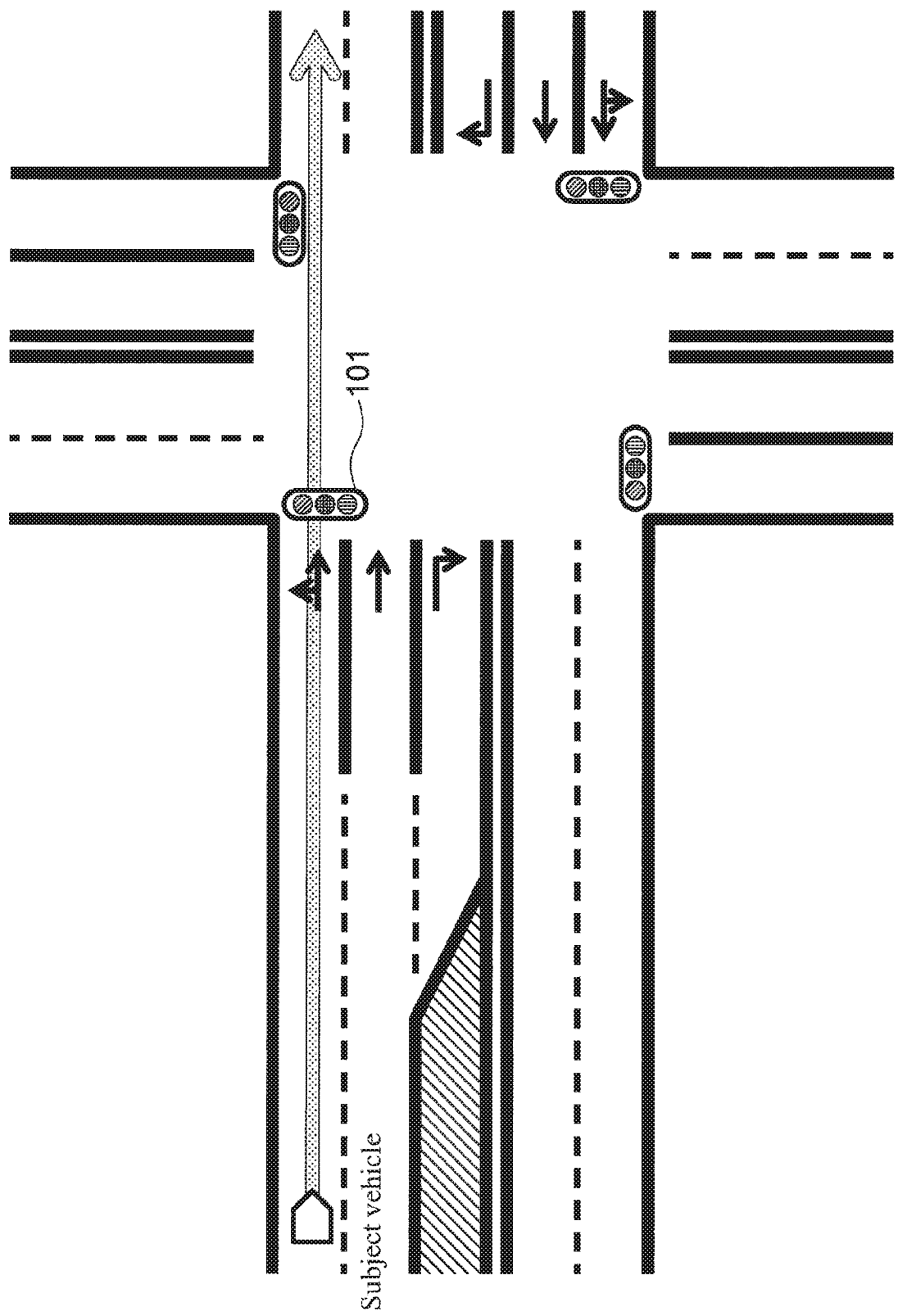

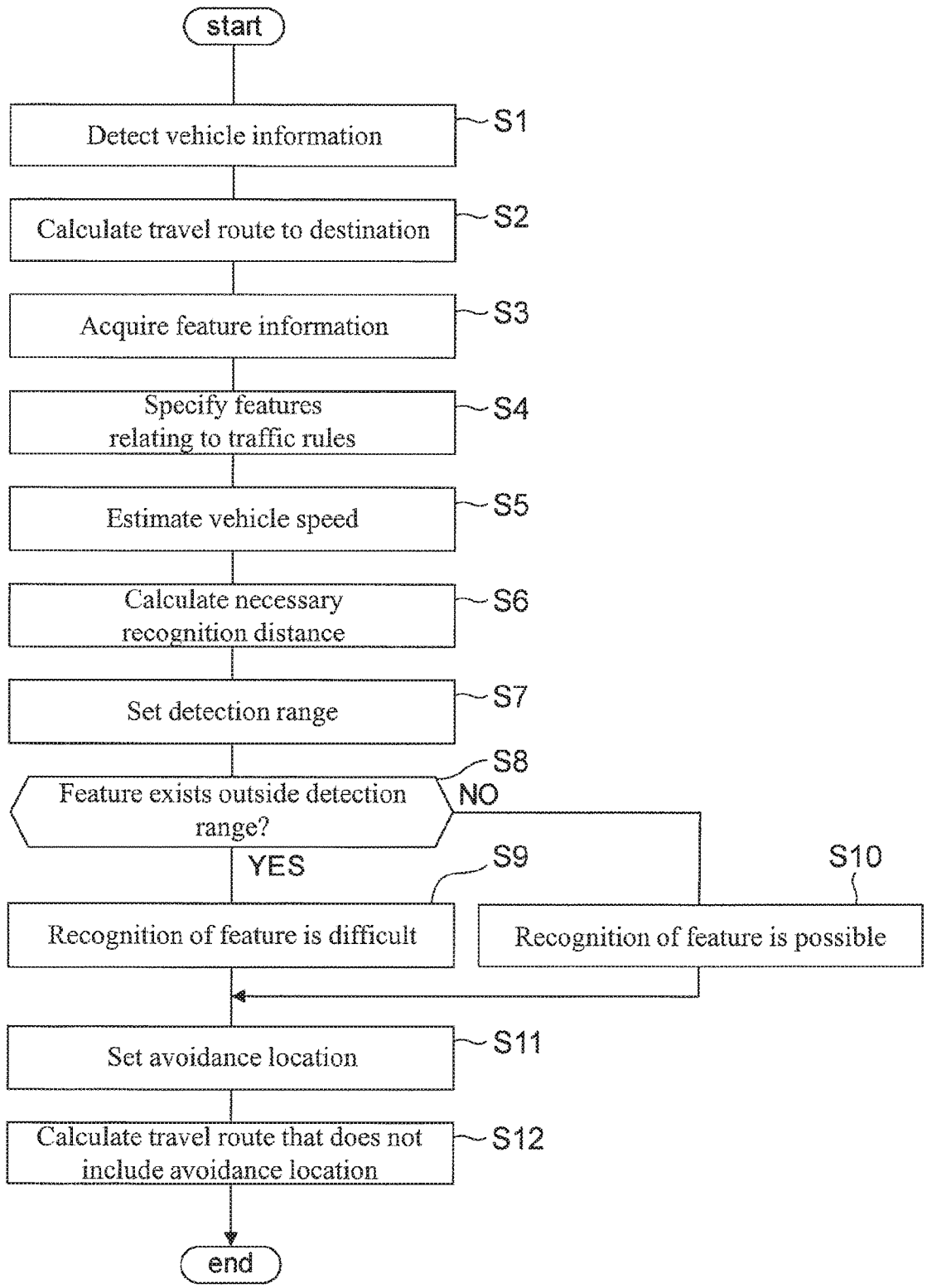

TRAVEL ROUTE CALCULATION DEVICE

TECHNICAL FIELD

The present invention relates to a travel route calculation device that calculates a travel route.

BACKGROUND

Route guidance devices are heretofore known which are configured to guide a route to a designated destination while being reflected with an isolated intersection at which there is the risk for a vehicle to be isolated without smoothly passing through the intersection. For example, JP2012-247315A discloses a route guidance device in which a risk value matrix is prepared for each factor feature, such as a railroad crossing and a lane decreased portion of a road, which exists in the leaving direction from an intersection. The risk value matrix gives a risk value score that indicates the possibility that the intersection can be an isolated intersection. For a search result of the route from a starting point to a destination, the route guidance device refers to the risk value matrix for each intersection on that route to obtain the risk value score and extracts, as the isolated intersection, an intersection at which the risk value score exceeds a predetermined threshold. Then, the route guidance device searches and guides a route that allows avoidance of the isolated intersection.

SUMMARY

Drive assist vehicles or autonomous drive vehicles perform an action of the vehicle and travel while recognizing traffic signals and the like. In such vehicles performing the action decision, information necessary for the action decision has to be collected for an appropriate drive.

In the above technique of JP2012-247315A, however, the index of the degree of risk is based on whether there is the risk for a vehicle to be isolated at an intersection, and it is not perceived whether the vehicle can recognize the intersection. Thus, even when the degree of risk is low at an intersection, for example, the vehicle cannot recognize a feature necessary for the action decision if the feature cannot be detected by a sensor, and the vehicle cannot appropriately travel.

A problem to be solved by the present invention is to provide a travel route calculation device that, for a vehicle traveling in accordance with an action decision, can calculate a travel route on which features necessary for the action decision are not readily perceived.

The present invention solves the above problem through measuring a necessary recognition distance that is necessary for a subject vehicle to recognize a feature when deciding an action of the subject vehicle, determining difficulty in recognizing the feature, on the basis of a detection range of a feature detection unit and the necessary recognition distance, and calculating a travel route while avoiding a location at which recognition of the feature is determined to be difficult.

According to the present invention, the difficulty in recognizing a feature necessary for deciding an action is perceived on the travel route for the vehicle to arrive at a destination and it is therefore possible to calculate a travel route that allows the vehicle to readily recognize the feature.

DETAILED DESCRIPTION OF THE DRAWINGS

FIG. 2 is a view illustrating an example of the layout of a road;

FIG. 3 is a flowchart illustrating a control flow of a travel route calculation device;

DETAILED DESCRIPTION OF THE EMBODIMENTS

Hereinafter, embodiments of the present invention will be described with reference to the drawings.

«First Embodiment»

Figure 1:
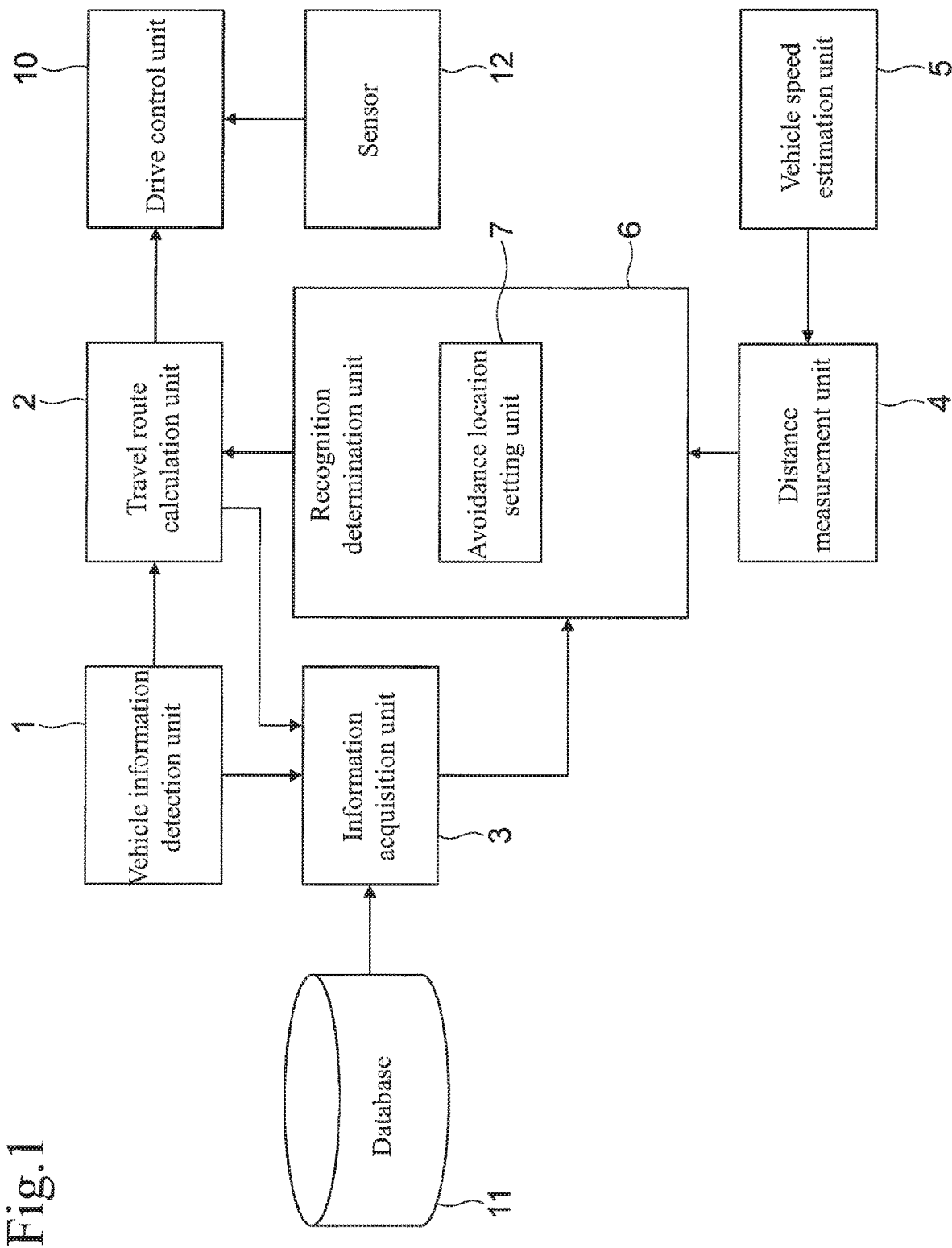
FIG. 1 is a block diagram of a travel route calculation device according to an embodiment of the present invention.

FIG. 1 is a block diagram of a travel route calculation device according to an embodiment of the present invention. The travel route calculation device according to the present embodiment is a device that is equipped in a vehicle to calculate a travel route when the vehicle performs autonomous drive.

The travel route calculation device comprises a read only memory (ROM) that stores various programs, a central processing unit (CPU) as an operation circuit that executes the programs stored in the ROM, and a random access memory (RAM) that functions as an accessible storage device.

The travel route calculation device comprises a drive control unit 10, a database 11, and a sensor 12. The database 11 stores map data, information on features, information on roads, etc. The map data includes link data and node data. The information on features includes, for example, information on traffic signals, information on railroad crossings, and information on traffic signs. The information on roads includes information on intersections, information on road-merging sections, and road-shape information of road-branching sections. The sensor 12 is a sensor for detecting situations around a subject vehicle. Examples of the sensor 12 include cameras, millimeter-wave devices, and radars.

The drive control unit 10 controls the autonomous drive of the subject vehicle on the basis of detection values of the sensor 12. The drive control unit 10 uses the sensor 12 to recognize features necessary for deciding an action of the subject vehicle. The action decision during the autonomous drive is performed by the vehicle recognizing features, such as traffic signals, traffic signs and railroad crossings, on the travel route. The drive control unit 10 specifies a target point when performing an action of the subject vehicle, on the basis of the features. For example, when the vehicle turns right as a result of the action decision, the target point is the location of an intersection at which the vehicle turns right. Then, the drive control unit 10 performs the decided action at the target point. This allows the subject vehicle to autonomously travel.

As an example, an autonomous drive will be described, in which the subject vehicle is to travel through an intersection located ahead of the subject vehicle. Assume that the feature is a traffic signal provided at the intersection and the action of the subject vehicle in accordance with the indication of the traffic signal is the behavior of the vehicle. When the traffic signal is red or yellow, the action of the subject vehicle is an operation to stop the vehicle at a stop line of the intersection. When, on the other hand, the traffic signal is green, the action of the subject vehicle is an operation to pass through the intersection at a given speed. Thus, the traffic signal and the intersection are features that cause change in the behavior of the subject vehicle. The drive control unit 10 sets a target point for deciding the action, to the intersection. Before the vehicle enters the intersection, the drive control unit 10 recognizes the traffic signal from a location separate from the intersection by a predetermined distance. The traffic signal is detected by the sensor 12. Then, as the vehicle approaches the intersection, the drive control unit 10 recognizes the traffic signal and decides an action in accordance with the color indicated by the traffic signal. Then, the drive control unit 10 makes the vehicle travel in accordance with the decided action. This allows the autonomous drive of the vehicle. The drive control unit 10 performs autonomous drive control as the above in a repetitive manner during the travel on the travel route. Note that the above control of autonomous drive is merely an example and another control method may also be employed.

The travel route calculation device has a vehicle information detection unit 1, a travel route calculation unit 2, an information acquisition unit 3, a distance measurement unit 4, a vehicle speed estimation unit 5, and a recognition determination unit 6 as functional blocks for calculating a travel route suitable for autonomous drive when performing the autonomous drive of a vehicle as the above. The recognition determination unit 6 has an avoidance location setting unit 7.

The vehicle information detection unit 1 detects vehicle information of the subject vehicle. The vehicle information includes positional information of the subject vehicle and other items. The vehicle information detection unit 1 has a function to be used with the GPS or the like.

The travel route calculation unit 2 acquires the vehicle information from the vehicle information detection unit 1 and calculates a travel route from the current position of the vehicle to a destination while referring to the map data. The destination is input, for example, by a user. The map data is stored in the database 11. This allows the travel route calculation unit 2 to calculate the travel route on the basis of the vehicle information.

When an avoidance location is set by the avoidance location setting unit 7, the travel route calculation unit 2 calculates the travel route so as to avoid the avoidance location.

The information acquisition unit 3 acquires a travel route from the travel route calculation unit 2. The information acquisition unit 3 also acquires information concerning features on the travel route. The features are futures which the subject vehicle should recognize when deciding the action. The features are also futures that represent traffic rules which the driver should follow when driving the vehicle. Examples of the features include traffic signals, traffic signs and railroad crossings on the travel route.

The information acquisition unit 3 further acquires information on roads from the travel route calculation unit 2. The information on roads includes not only information concerning roads on the travel route but also information concerning roads connecting to the roads on the travel route. For example, when a traffic signal exists on the travel route, the information on roads includes not only road information of the road on which the travel of the vehicle is planned but also information on the intersection at which the traffic signal is provided and road information of a road connecting to the intersection.

The distance measurement unit 4 measures a necessary recognition distance. The necessary recognition distance is a distance necessary for the subject vehicle to recognize the feature when deciding an action of the subject vehicle. This distance is a distance from the feature to be recognized to the subject vehicle.

The vehicle speed estimation unit 5 estimates a vehicle speed of the subject vehicle when traveling toward the feature on the travel route.

The recognition determination unit 6 determines difficulty in recognizing the feature, on the basis of the detection range of the sensor 12 and the necessary recognition distance measured by the distance measurement unit 4. Features to which the difficulty is determined are features which the subject vehicle has to recognize when the drive control unit 10 performs the autonomous drive.

The avoidance location setting unit 7 sets a location at which the recognition of a feature is determined to be difficult by the recognition determination unit 6, as an avoidance location.

When an avoidance location is set at the time of calculation of the travel route, the travel route calculation unit 2 calculates the travel route to the destination while avoiding the avoidance location. The drive control unit 10 controls the drive of the vehicle on the basis of the travel route which is calculated to avoid the avoidance location.

Here, the difficulty in recognizing a feature will be described with reference to FIG. 2. FIG. 2 is a view illustrating the layout of an intersection.

For example, as illustrated in FIG. 2, when the subject vehicle travels through the intersection by autonomous drive, the subject vehicle has to decide an action in accordance with the indication of a traffic signal 101. When the indication of the traffic signal 101 is red, the subject vehicle has to stop before the stop line of the intersection. In order for the subject vehicle to perform such an action decision, the sensor 12 has to recognize the traffic signal 101 using the sensor 12.

The braking distance of a vehicle is determined by the vehicle speed. For example, when the vehicle is traveling at a high speed, the braking distance is long. In order that, in such a situation, the vehicle is made to stop at the stop line due to the red indication of the traffic signal 101, the vehicle has to recognize the traffic signal 101 at a position separate from the position of the traffic signal 101 at least by the braking distance.

The detection range of the sensor 12 is preliminarily determined by the performance of the sensor 12, etc. If the vehicle is located at a position separate from the position of the traffic signal 101 at least by the braking distance and the traffic signal 101 exists outside the detection range of the sensor 12, recognition of the traffic signal 101 will be difficult. Thus, when the subject vehicle travels on a travel route on which the recognition of a feature is difficult, the drive control unit 10 cannot recognize a necessary feature for autonomous drive using the sensor 12 and it may be possible that the autonomous drive cannot be performed in a normal manner.

The travel route calculation device according to the present embodiment, therefore, determines whether features are recognizable on the travel route, and sets a location at which the recognition of a feature is difficult, as an avoidance location on the travel route. Then, the travel route calculation device calculates the travel route so as to avoid the avoidance location. The travel route can thus be suitable for the autonomous drive.

Control of the travel route calculation device will then be described while referring to a specific example. FIG. 3 is a flowchart illustrating a control flow of the travel route calculation device. The flowchart illustrated in FIG. 3 represents a flow that is performed before the autonomous drive control is executed and performed when a destination is input by the user or the like. A specific exemplary case is assumed in which the travel route includes a plurality of intersections each with traffic signals from the current position of the vehicle to the destination. In the description below, traffic signals are mentioned as the features, for descriptive purposes, but the features are not limited to traffic signals and may also be, for example, other features such as road traffic signs.

In step S1, the vehicle information detection unit 1 detects a position of the subject vehicle as the current vehicle information of the subject vehicle. The position of a vehicle is detected by a combination of the global positioning system (GPS), a gyro-sensor, a vehicle speed sensor, and the like. The position of a vehicle is not limited to a current position of the vehicle stopping and may also be a current position of the vehicle traveling.

In step S2, the travel route calculation unit 2 calculates a travel route to a destination on the basis of the current position of the vehicle. The travel route is a route on which the subject vehicle is to travel from there. The travel route may be calculated using a car navigation system. Calculation of the travel route may not necessarily obtain a lane in which the vehicle should travel, and suffices to determine whether the vehicle should go straight ahead on the route or go straight through, turn right or turn left at an intersection.

In step S3, the information acquisition unit 3 acquires feature information from the database 11. In step S4, the recognition determination unit 6 specifies a feature regarding traffic rules on the traffic route from the feature information. The feature to be specified is that the subject vehicle must follow when traveling on the travel route. When the travel route includes a plurality of traffic signals, the recognition determination unit 6 specifies the traffic signal at each point. The recognition determination unit 6 specifies traffic signals at all of the intersections on the travel route.

In step S5, the vehicle speed estimation unit 5 estimates a vehicle speed at which the subject vehicle travels toward the feature specified by the recognition determination unit 6. The database 11 stores a legal speed of each road as the map data. The vehicle speed estimation unit 5, therefore, refers to the position of the feature and roads on the travel route to estimate the legal speed of the road for travel toward the feature as a vehicle speed.

The vehicle speed estimation unit 5 may not necessarily estimate the legal speed as the vehicle speed of the subject vehicle. The vehicle speed estimation unit 5 may also estimate a lower vehicle speed than the legal speed. This is because a vehicle cannot necessarily travel at the legal speed when traveling through an intersection. For example, the subject vehicle cannot turn at the legal speed when tuning right at an intersection. In addition, the Road Traffic Act defines that, when a vehicle turns right or left at an intersection, the vehicle must travel at a speed that allows the vehicle to stop at any time. In almost all cases, therefore, a vehicle does not travel at the legal speed at an intersection when the vehicle plans to turn. In such cases, the vehicle speed estimation unit 5 estimates a lower speed than the legal speed as the vehicle speed of the subject vehicle, that is, the speed when traveling through the intersection.

When the vehicle speed estimation unit 5 estimates a lower speed than the legal speed as the vehicle speed of the subject vehicle, the vehicle speed estimation unit 5 may estimate the vehicle speed on the basis of a vehicle speed when having traveled in past times on the road for which the vehicle speed is estimated.

In step S6, the distance measurement unit 4 measures a necessary recognition distance on the basis of the vehicle speed estimated by the vehicle speed estimation unit 5.

Here, the relationship between the behavior of a vehicle and the necessary recognition distance will be described. Behavior conditions of a vehicle traveling, for example, toward an intersection may be severe when the amount of braking operation has to be suddenly increased or when the steering angle of a steering wheel has to be suddenly increased. For example, when a vehicle is to travel straight through an intersection but the signal turns red, the behavior conditions of the vehicle will be severe.

Assume that, when the subject vehicle is traveling at a location before an intersection, v [km/h] represents the speed when traveling toward the intersection and t represents a time required for the subject vehicle to decelerate using a fixed deceleration (0.15 G) from the location at which the action decision is performed to the stop line of the intersection. The location at which the action decision is performed is a location at which the braking operation is started to stop at the stop line. The stop position of the subject vehicle is assumed to be the same position as the position of the traffic signal, for easy description.

The distance (d [m]) from the location at which the action decision is performed to the stop line of the intersection is represented by Equation (1).

[Expression 1]
$$d = \frac{v}{3.6} \times t - \frac{1}{2} \times (0.15 \times 9.8) \times t^2 \quad (1)$$

In addition, the relationship between the speed (v) when traveling toward the intersection and the time (t) is represented by Equation (2).

[Expression 2]
$$\frac{v}{3.6} = (0.15 \times 9.8) \times t \quad (2)$$

The distance (d) is therefore represented by Equation (3) from Equations (1) and (2).

[Expression 3]
$$d = \frac{v^2}{2 \times 3.6^2 \times (0.15 \times 9.8)} \quad (3)$$

Given that the legal speed is 60 [km/h], for example, v=60 [km/h] is substituted into Equation (3) to obtain d=94.48 [m]. The behavior of a vehicle is such that, when the vehicle is traveling at a vehicle speed (v=60 [km/h]) toward the intersection, the braking distance is 94.48 [m]. In the case of autonomous drive, in order that the subject vehicle stops at the stop line in accordance with such behavior of a vehicle, the subject vehicle has to recognize the traffic signal while ensuring the braking distance. That is, the braking distance represented by Equation (3) corresponds to the necessary recognition distance and the distance measurement unit 4 can measure the necessary recognition distance using the above arithmetic expression.

The necessary recognition distance may be changed in accordance with positions of features on the layout (in the example of FIG. 2, positions of traffic signals in the intersection). For example, assume an autonomous drive in which a vehicle is made to stop at a stop line when the traffic signal is provided before an intersection on the travel route (see FIG. 2). In this case, the position of the stop line and the position of the traffic signal are close to each other and, therefore, when the necessary recognition distance can be ensured at least as an amount corresponding to the braking distance of the vehicle, the vehicle can be made to stop at the stop line while recognizing the traffic signal.

On the other hand, assume an autonomous drive in which a vehicle is made to stop at the stop line when the traffic signal is provided beyond the intersection on the travel route. In this case, the traffic signal is provided at a position farther than the stop line on the travel route. The necessary recognition distance is therefore a distance obtained by adding the distance between the stop line and the traffic signal to the braking distance of the vehicle.

In step S7, the recognition determination unit 6 sets a detection range of the sensor 12 for the position of the subject vehicle. The position of the subject vehicle is a position separate from the feature as a recognition object by a distance corresponding to the necessary recognition distance.

For example, the sensor 12 is assumed to be provided such that, in addition to a camera, a plurality of sensors such as a millimeter-wave device, radar and laser is provided at the subject vehicle and these sensors complement each detection range of the sensors. Here, the detection range (detection distance) of a sensor as the typical value (nominal value) of the sensor performance may be 200 meters in the case of a millimeter-wave device, hundreds of meters in the case of radar, 100 meters in the case of laser, and tens of meters in the case of a camera.

The detection range of a sensor may be defined not only by a distance but by an angle. The detection range of a millimeter-wave device is relatively narrow angle, but the detection range of a camera can be selected to be narrow or wide because of a wide angle of lenses.

When a plurality of sensors is arranged such that they cover the same range to reduce erroneous recognition, the maximum detection range by these sensors may be used as the detection range of the sensors or the minimum detection range may be used as the detection range of the sensors.

The description below will be made on the assumption that an imaging range of the sensor 12 is the detection range (e.g. 50 meters) of the sensor, for easy description.

In step S8, the recognition determination unit 6 compares the detection range of the sensor 12 with the necessary recognition distance to determine whether or not the feature is located outside the detection range of the sensor 12. When the necessary recognition distance is larger than the detection range of the sensor 12, the recognition determination unit 6 determines that the feature is located outside the detection range of the sensor 12. On the other hand, when the necessary recognition distance is not larger than the detection range of the sensor 12, the recognition determination unit 6 determines that the feature is located within the detection range of the sensor 12.

When the feature is located outside the detection range of the sensor 12, the recognition determination unit 6 determines, in step S9, that the recognition of the feature is difficult. On the other hand, when the feature is located within the detection range of the sensor 12, the recognition determination unit 6 determines, in step S10, that the recognition of the feature is possible.

The control flow of steps S5 to S10 will be further specifically described with reference to two patterns of layouts illustrated in FIGS. 4A and 4B.

Figure 4A:
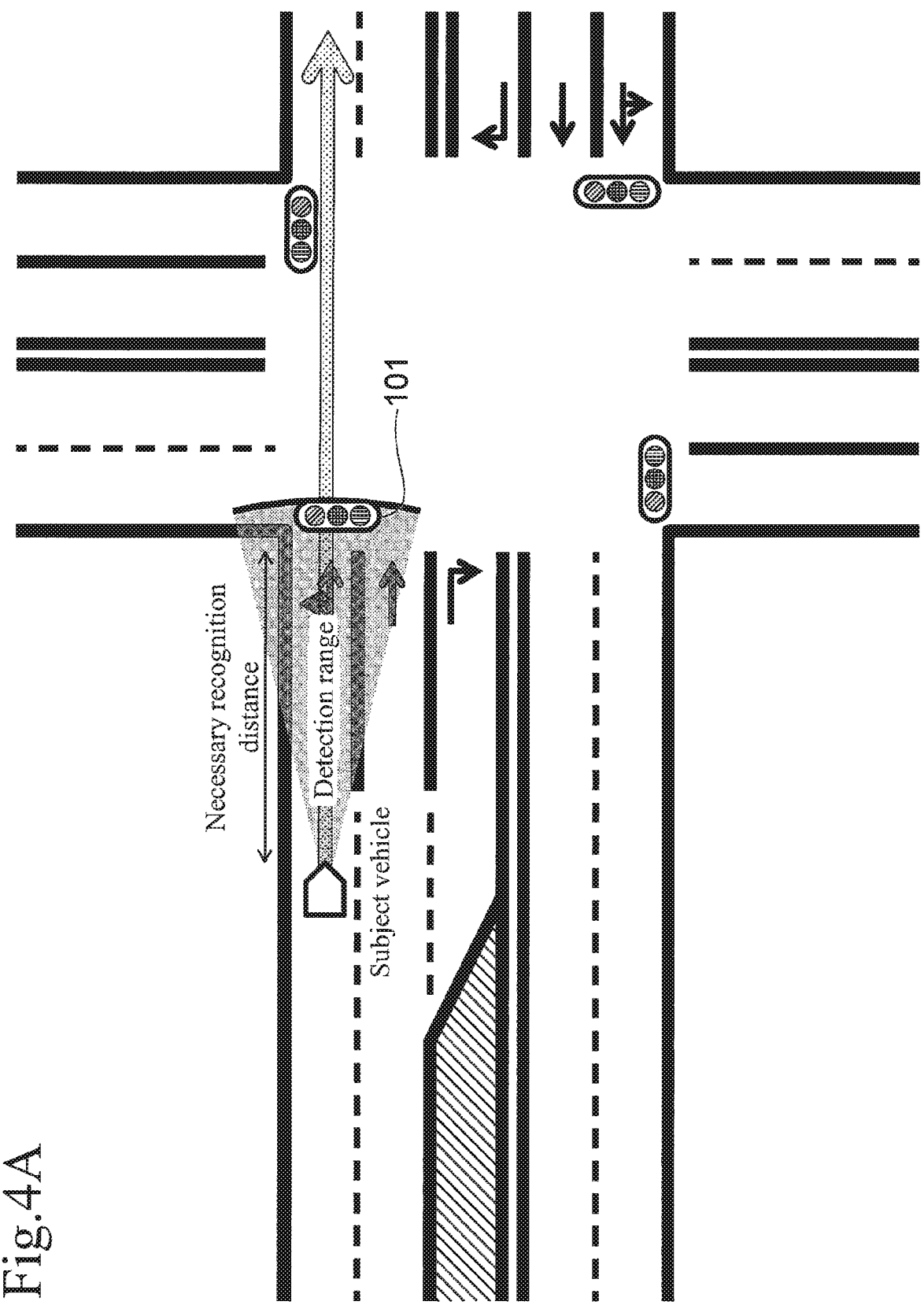
FIG. 4A is a view illustrating an example of the layout of a road.
Figure 4B:
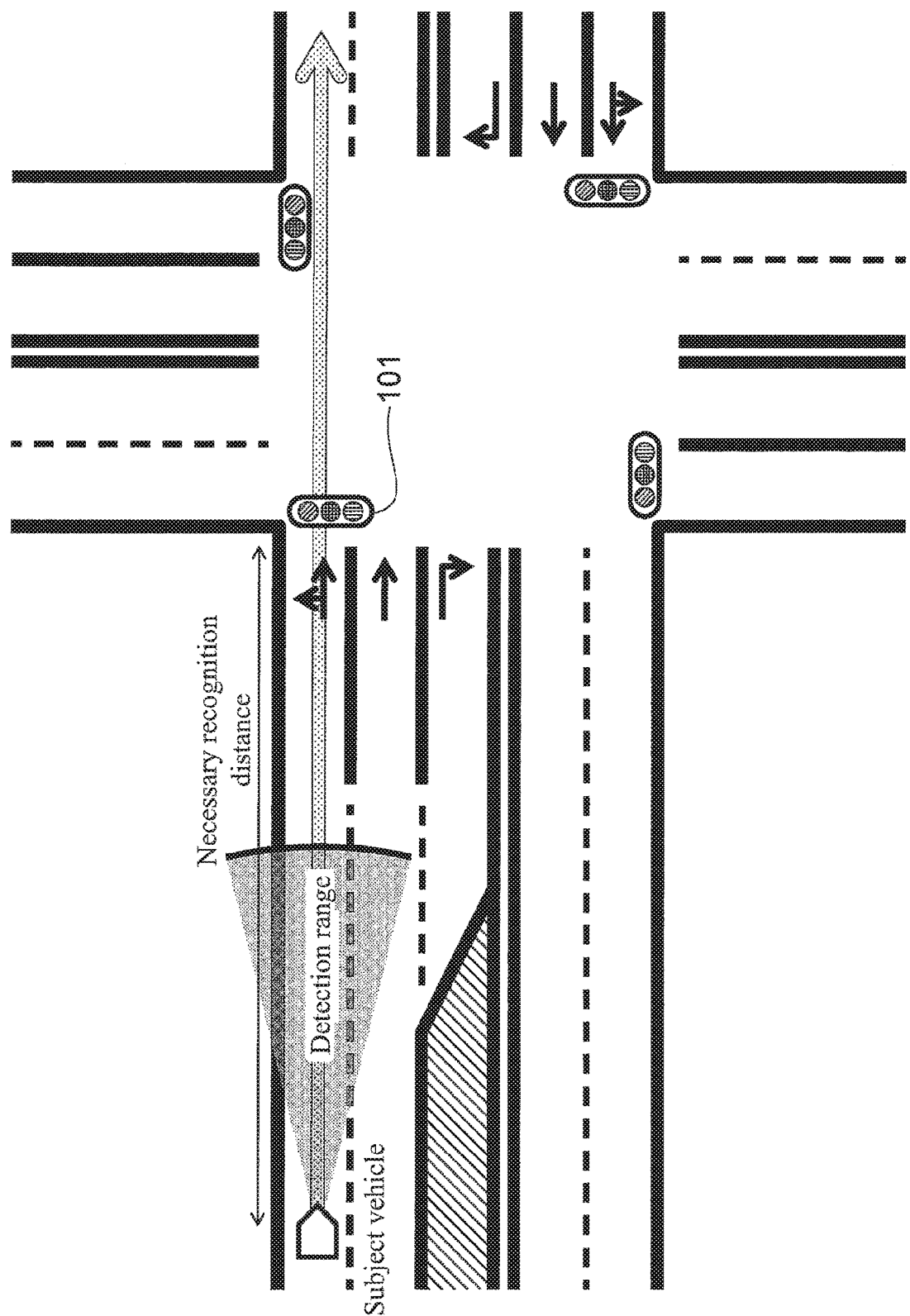
FIG. 4B is a view illustrating an example of the layout of a road.

FIGS. 4A and 4B are views each illustrating the layout of an intersection. In the example of FIG. 4A, the subject vehicle is traveling on a road before passing through an intersection and the legal speed of the road is assumed to be 40 km/h. In the example of FIG. 4B, the subject vehicle is traveling on a road before passing through an intersection and the legal speed of the road is assumed to be 60 km/h.

In the example of FIG. 4A, the vehicle speed estimation unit 5 estimates a vehicle speed (40 km/h) when traveling toward the traffic signal 101. The distance measurement unit 4 calculates the necessary recognition distance (42 m) using the above arithmetic expression. The recognition determination unit 6 sets the detection range (50 m) of the sensor 12 for the position of the subject vehicle.

Since the necessary recognition distance is not larger than the detection range of the sensor, as illustrated in FIG. 4A, the traffic signal 101 exists within the detection range of the sensor 12. The recognition determination unit 6 determines that the traffic signal 101 is a recognizable feature.

In the example of FIG. 4B, the vehicle speed estimation unit 5 estimates a vehicle speed (60 km/h) when traveling toward the traffic signal 101. The distance measurement unit 4 calculates the necessary recognition distance (about 93 m) using the above arithmetic expression. The recognition determination unit 6 sets the detection range (50 m) of the sensor 12 for the position of the subject vehicle.

Since the necessary recognition distance is larger than the detection range of the sensor, as illustrated in FIG. 4B, the traffic signal 101 exists outside the detection range of the sensor 12. The recognition determination unit 6 determines that the traffic signal 101 is a feature that is difficult to recognize.

When the travel route includes a plurality of features which the driver should follow, the control flows of steps S5 to S10 are performed for a feature nearest to the subject vehicle and the control flows of steps S5 to S10 are then performed for the second-to-nearest feature to the subject vehicle. Thus, the control flow of steps S5 to S10 is performed for each of all the features which exist on the travel route on which the subject vehicle is to travel from the current position.

In step S11, the avoidance location setting unit 7 sets the location at which the recognition of a feature is determined to be difficult, as an avoidance location. As for the examples of FIGS. 4A and 4B, the intersection illustrated in FIG. 4A is not set as an avoidance location, but the intersection illustrated in FIG. 4B is set as an avoidance location. More specifically, as for the intersection illustrated in FIG. 4B, when the subject vehicle travels toward the intersection at the estimated vehicle speed, the subject vehicle will be difficult to recognize the traffic signal 101 using the sensor 12 for deciding an action. The intersection illustrated in FIG. 4B is therefore set as an avoidance location.

In step S12, the travel route calculation unit 2 calculates a travel route from the current position of the vehicle to the destination while avoiding the avoidance location. A method of calculating the travel route may be to use a scheme based on a graph search theory, such as Dijkstra's algorithm. In addition or alternatively, the travel route calculation unit 2 may weight a link connected to an avoidance location (node) more than other links and calculate a travel route that does not pass through the weighted link. The calculation result from the travel route calculation unit 2 is output to the drive control unit 10. The control flow illustrated in FIG. 3 is thus completed.

Thus, in one or more embodiments of the present invention, when the subject vehicle plans to travel on a route and the route includes an intersection with traffic signals which the subject vehicle has to pass through, the difficulty in recognizing a traffic signal is determined on the basis of the detection range of the onboard sensor 12 before the subject vehicle actually approaches the intersection. It is therefore possible to determine whether to pass through or avoid the intersection with that traffic signal. It is also possible to calculate a travel route that allows a drive assist vehicle or autonomous drive vehicle to readily recognize features and travel thereon.

As the above, in one or more embodiments of the present invention, the necessary recognition distance from the subject vehicle to a feature, which is necessary for recognition of the feature, is measured. Then, the difficulty in recognizing the feature is determined on the basis of the detection range of the sensor 12 and the necessary recognition distance, and the travel route is calculated while avoiding a location at which the recognition of the feature is determined to be difficult. Through this operation, the travel route of the subject vehicle to the destination is calculated in accordance with the recognizability of a feature which is necessary when deciding an action. Since the drive assist vehicle or autonomous drive vehicle can therefore calculate routes on which the vehicle can travel and routes on which the vehicle is difficult to travel, the drive assist vehicle or autonomous drive vehicle calculate a route on which the vehicle can readily recognize a feature.

In one or more embodiments of the present invention, when a certain feature is located at a position separate from the subject vehicle by the necessary recognition distance and the certain feature exists outside the detection range of the sensor 12, a determination is made that the recognition of the feature is difficult. Thus, whether the recognition of a feature is difficult or not can be determined in accordance with the detection range of the sensor 12.

In one or more embodiments of the present invention, the vehicle speed of the subject vehicle is estimated and the necessary recognition distance is measured on the basis of the estimated vehicle speed. This allows measurement of the necessary recognition distance under a vehicle condition when actually traveling on the travel route.

In one or more embodiments of the present invention, the legal speed is estimated as the vehicle speed and the necessary recognition distance is measured on the basis of the legal speed. This allows determination of the difficulty in recognizing a feature under the most severe speed condition.

In one or more embodiments of the present invention, a vehicle speed when having traveled in past times is estimated as the vehicle speed and the necessary recognition distance is measured on the basis of the estimated speed. This allows determination of the difficulty in recognizing a feature in accordance with an actual travel condition.

In one or more embodiments of the present invention, the detection range of the sensor 12 is set in accordance with the typical value of the sensor 12. This allows the error of the sensor 12 and the tendency of the detection range of the sensor 12 to be reflected on the determination of difficulty of a feature.

In one or more embodiments of the present invention, the necessary recognition distance is measured on the basis of the behavior of the subject vehicle. Through this operation, the necessary recognition distance is measured with consideration for typical behavior of the subject vehicle. A smooth drive comparative with those by human drivers can therefore be realized even in a drive assist vehicle or autonomous drive vehicle.

In a modified example of the present invention, the recognition determination unit 6 may set the detection range of the sensor 12 in accordance with a crowded state of the travel route. Data representing the crowded state of the travel route may be stored in the database 11 or may also be acquired from external of the vehicle. The crowded state is a crowded state with vehicles when traveling toward a feature as an object for which the difficulty in recognizing it is determined. For example, when, in the layout of FIG. 2, the travel route is continuously crowded with vehicles for a certain period of time, another vehicle may exist between the subject vehicle and the traffic signal 101 to blind the traffic signal 101, so that the detection range of the sensor 12 is restricted to the distance from the subject vehicle to the other vehicle. In a travel route that is expected to be crowded with vehicles, therefore, the recognition determination unit 6 reduces the detection range as the degree of crowded state with vehicles increases. When the crowded state with vehicles is temporary, the recognition determination unit 6 may set the detection range of the sensor 12 in accordance with the typical value. Through the above operation, when the detection range of the sensor 12 varies in accordance with an expected crowded situation with vehicles, a determination can be made whether or not the feature information necessary when deciding an action is recognizable, with consideration for the detection range.

In the above, an example is described in which the travel route calculation device is equipped in an autonomous drive vehicle, but the travel route calculation device may also be equipped in a drive assist vehicle. The drive assist vehicle is a vehicle to which drive assist is applied so as to assist the drive of a vehicle by the driver, for example, the drive when changing lanes. When the lane change is assisted using a sensor such as a camera in the drive assist vehicle, the drive is assisted while recognizing the location of the lane change. The travel route calculation device calculates a travel route at which the location of the lane change can readily be recognized. Then, the drive of the drive assist vehicle is assisted on the basis of the calculated travel route.

The travel route calculation device may calculate the travel route not only when the vehicle is traveling but also when the vehicle is stopping.

The above travel route calculation unit 2 corresponds to the "travel route calculation unit" of the present invention, the information acquisition unit 3 corresponds to the "information acquisition unit" of the present invention, the distance measurement unit 4 corresponds to the "distance measurement unit" of the present invention, the vehicle speed estimation unit 5 corresponds to the vehicle speed estimation unit" of the present invention, the recognition determination unit 6 corresponds to the "determination unit" of the present invention, and the sensor 12 corresponds to the "feature detection unit" of the present invention.

«Second Embodiment»

Figure 5:
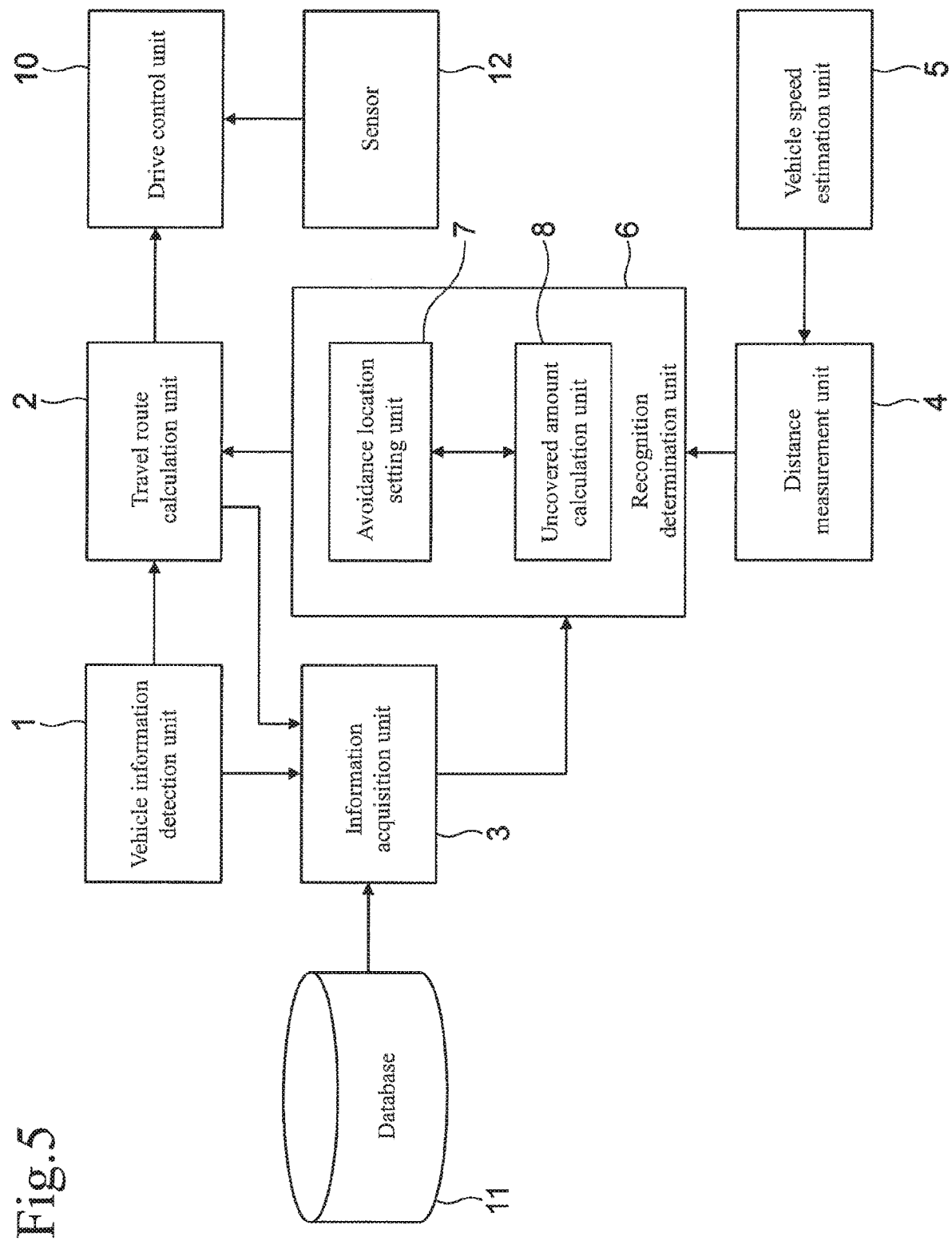
FIG. 5 is a block diagram of a travel route calculation device according to another embodiment of the present invention.

FIG. 5 is a block diagram of a travel route calculation device according to another embodiment of the present invention. As compared with the above-described first embodiment, this embodiment is different in that the travel route calculation device comprises an uncovered amount calculation unit 8. Other features are the same as those in the above-described first embodiment and the description is borrowed herein.

The recognition determination unit 6 has an avoidance location setting unit 7 and an uncovered amount calculation unit 8. The uncovered amount calculation unit 8 calculates an uncovered amount of the necessary recognition distance extending beyond the detection range of the sensor 12. The recognition determination unit 6 determines the difficulty in recognizing a feature on the basis of the calculated uncovered amount.

Figure 6:
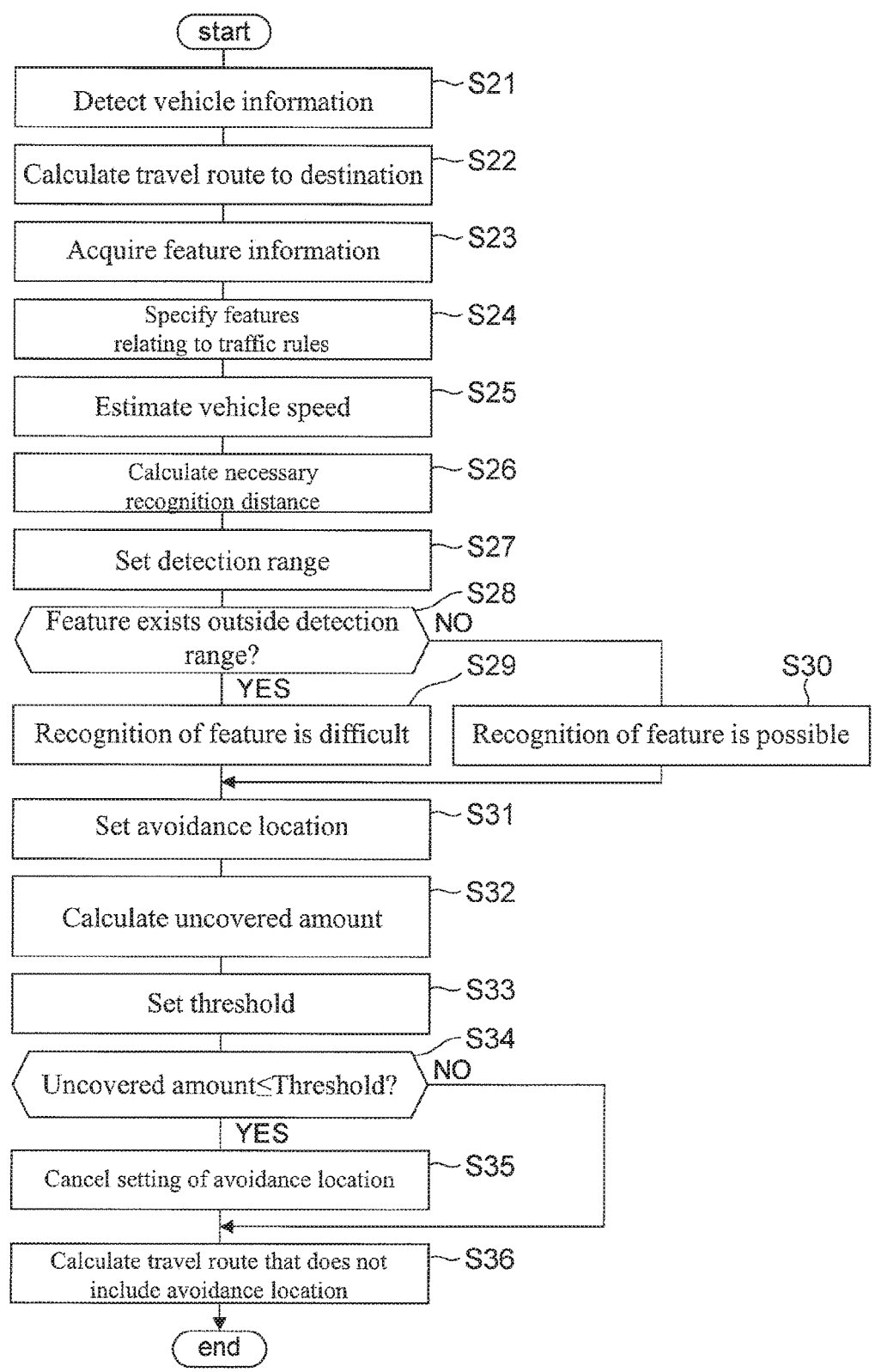
FIG. 6 is a flowchart illustrating a control flow of a travel route calculation device.

Control of the travel route calculation device will then be described while referring to a specific example. FIG. 6 is a flowchart illustrating a control flow of the travel route calculation device.

Figure 7A:
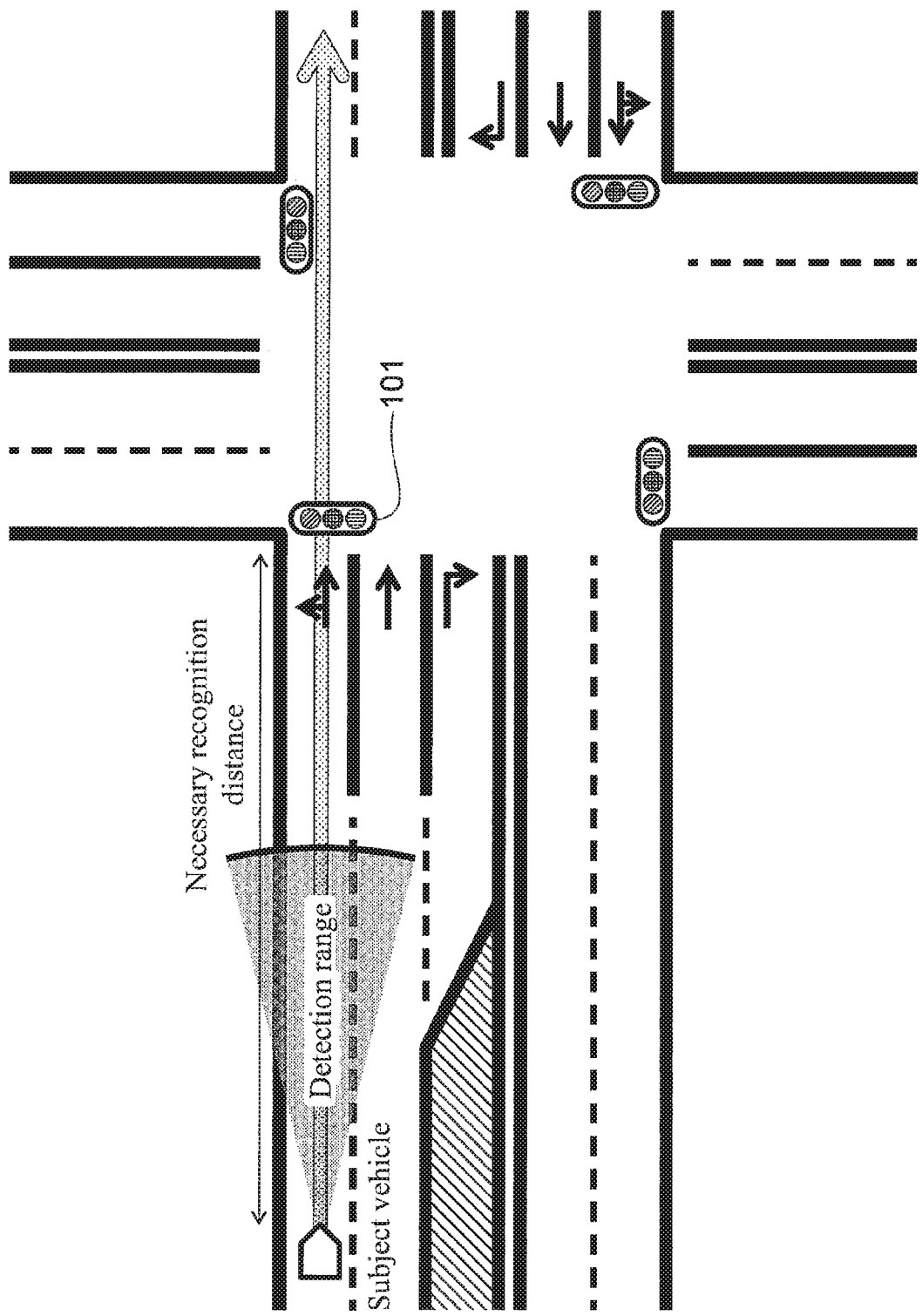
FIG. 7A is a view illustrating an example of the layout of a road.
Figure 7B:
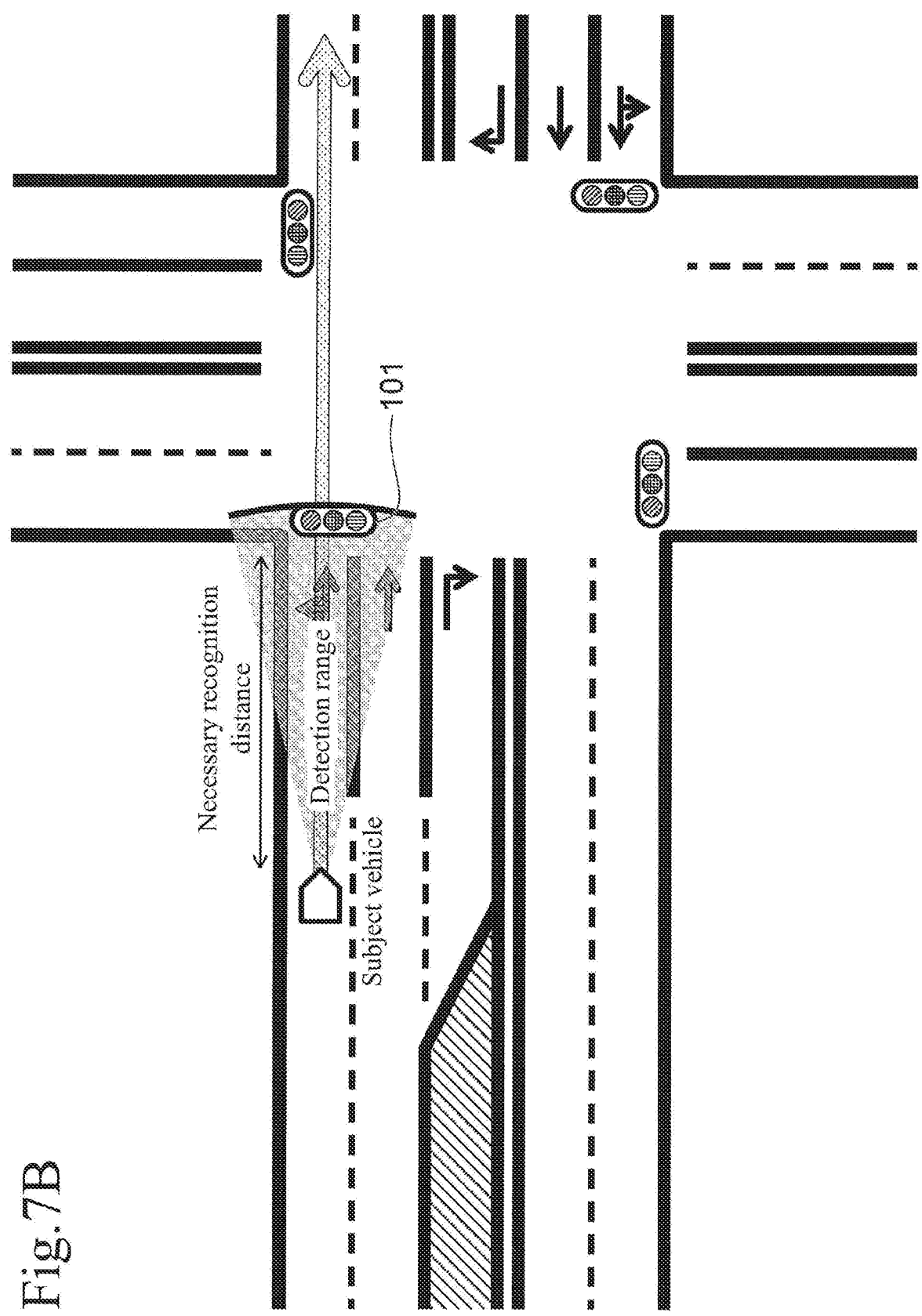
FIG. 7B is a view illustrating an example of the layout of a road.

FIGS. 7A and 7B are views each illustrating the layout of an intersection. FIGS. 7A and 7B are views for describing states in which the subject vehicle traveling before the intersection decelerates its vehicle speed from 60 km/h to 40 km/h. FIG. 7A illustrates a state in which the subject vehicle is traveling at a vehicle speed (60 km/h) before the deceleration and FIG. 7B illustrates a state in which the subject vehicle is traveling at a vehicle speed (40 km/h) after the deceleration.

The control flow of steps S21 to S31 is the same as the control flow of steps S1 to S11 of the first embodiment.

In step S32, the uncovered amount calculation unit 8 subtracts the detection range from the necessary recognition distance to calculate the uncovered amount. The necessary recognition distance for which the uncovered amount is calculated is a necessary recognition distance at a location at which the recognition of a feature is determined to be difficult. Assume that, for example in the example of FIG. 7A, the traffic signal 101 is determined to be a feature that is difficult to recognize and the traffic signal with the traffic signal 101 is set as an avoidance location. As illustrated in FIG. 7A, the necessary recognition distance corresponds to the braking distance of the subject vehicle, which is about 95 m when the deceleration is 0.15 G. When the detection range of the sensor 12 is 50 m, the uncovered amount is 45 m, which is the difference between the necessary recognition distance and the detection range.

In the example of FIG. 7A, the intersection is set as an avoidance location because the necessary recognition distance is longer than the detection range by the uncovered amount (45 m). Since the necessary recognition distance corresponds to the braking distance of the subject vehicle, the uncovered amount decreases as the braking distance decreases. That is, when the vehicle traveling before the intersection decelerates sufficiently from a vehicle speed of 60 km/h, the necessary recognition distance will be reduced to obtain a state in which the setting of the avoidance location at the intersection may be canceled.

Assume that, for example in the layout illustrated in FIG. 7A, the subject vehicle can preliminarily decelerate to 40 km/h with consideration for the change in indication of the traffic signal 101 around the intersection. As another situation, when turning right or left at the intersection, for example, the subject vehicle may have to temporarily decelerate or stop. When the subject vehicle is traveling before the intersection in accordance with the layout and the like of the travel route and road, therefore, the vehicle will initiate its behavior, such as behavior of decelerating to a vehicle speed lower than the legal speed. When the vehicle speed is 40 km/h and the deceleration is 0.15 G, the braking distance is 42 m. As illustrated in FIG. 7B, the necessary recognition distance is not larger than the detection range. In this case, therefore, the traffic signal 101 is a feature that is recognizable by the subject vehicle. Thus, the setting of the avoidance location at the intersection can be canceled.

In the examples of FIGS. 7A and 7B, as the vehicle speed decreases from 60 km/h to 40 km/h, the braking distance also decreases from 95 m to 42 m, so the difference is about 53 m. The uncovered amount is 45 m in the example of FIG. 4A whereas, in the example of FIG. 4B, the uncovered amount is not larger than 0 m because the necessary recognition distance decreases due to the speed reduction. That is, when the uncovered amount is not larger than the reduced amount of the necessary recognition distance due to the decelerated vehicle speed, the setting of the avoidance location can be canceled.

In step S33, the recognition determination unit 6 sets a threshold on the basis of the layout of the road set as an avoidance location and the calculated travel route. The threshold represents a reduced amount of the necessary recognition distance due to the decelerated vehicle speed. As the decelerated amount of the vehicle speed increases, the threshold also increases. For example, when the calculated travel route includes a right or left turn at an intersection, the subject vehicle reduces its vehicle speed as approaching the intersection. Also in such a case, a large threshold is set. For example, in the examples of FIGS. 7A and 7B, as the vehicle speed decreases from 60 km/h to 40 km/h, the reduced amount of the necessary recognition distance is 53 m (=95 m-42 m). The recognition determination unit 6 therefore sets the threshold to 53 m.

In step S34, the recognition determination unit 6 compares the uncovered amount with the threshold. When the uncovered amount is not larger than the threshold, the recognition determination unit 6 determines, in step S35, that the feature at the location set as an avoidance location is recognizable. Then, the avoidance location setting unit 7 cancels the setting of the avoidance location having the feature. On the other hand, when the uncovered amount is larger than the threshold, the avoidance location setting unit 7 does not cancel the setting of the avoidance location.

In step S36, the travel route calculation unit 2 calculates a travel route from the current position of the vehicle to the destination while avoiding the avoidance location.

In the examples of FIGS. 7A and 7B, the setting of the avoidance location at the intersection is canceled because the uncovered amount (45 m=necessary recognition distance (95 m)—detection range (50 m)) is not larger than the threshold (53 m). Then, the travel route calculation unit 2 calculates a travel route that includes the intersection illustrated in FIGS. 7A and 7B.

When a number of avoidance locations set in step S31 exist, there may be considered a case in which, if all of the avoidance locations are attempted to be avoided, no route exists which allows autonomous drive. In such a case, according to the present embodiment, the uncovered amount at each avoidance location is calculated and a determination is made whether or not the setting of the avoidance location can be canceled with consideration for the deceleration of the subject vehicle.

Thus, in one or more embodiments of the present invention, when the subject vehicle plans to travel on a route and the route includes an intersection with traffic signals which the subject vehicle has to pass through, the difficulty in recognizing a traffic signal is determined on the basis of the detection range of the onboard sensor 12 before the subject vehicle actually approaches the intersection, and a location having a feature that is difficult to recognize is set as an avoidance location. For the avoidance location thus set, the uncovered amount is calculated and the threshold and the uncovered amount are compared. Then, on the basis of the comparison result, a determination is made whether or not to cancel the setting of the avoidance location. This allows calculation of a travel route that is a route on which a drive assist vehicle or autonomous drive vehicle can travel and that represents smooth behavior.

As the above, in one or more embodiments of the present invention, the uncovered amount of the necessary recognition distance is calculated with respect to the detection range of the sensor 12 and the difficulty in recognizing a feature is determined on the basis of the uncovered amount. Through this operation, the location with a small uncovered amount need not be an avoidance location and can be included in the route to calculate the travel route.

In one or more embodiments of the present invention, the uncovered amount is calculated on the basis of the decelerated amount of the vehicle speed of the subject vehicle. Through this operation, even if there is a location that has to be avoided in an ordinary travel, the location can be included in the travel route, provided that the subject vehicle can travel through the location when decelerating.

The recognition determination unit 6 sets a location as the avoidance location as a result of the control process of steps S28 to S31 and cancels the setting as a result of the control process of steps S32 to S35. This control may be modified such that an avoidance location is set when the condition of "Yes" of step S28 and the condition of "Yes" of step S34 are satisfied.

In a modified example of the present invention, the recognition determination unit 6 calculates uncovered amounts on each of a plurality of travel routes at each of a plurality of locations present on each travel route and calculates the sum of uncovered amounts on each of the plurality of travel routes. The plurality of locations represents those which each have a feature to be recognized by the subject vehicle when the subject vehicle decides its action. Then, the travel route calculation unit 2 calculates a travel route so as to exclude the travel route, on which the sum is highest, of the plurality of travel routes from candidates for the travel route on which the subject vehicle travels. Through this operation, it is possible to exclude a route unsuitable for the travel, such as a travel route that is not linear and a travel route on which the number of decelerations is large, of the plurality of travel routes, and a more natural travel route can be calculated. In an alternative embodiment, the recognition determination unit 6 may calculate the number of uncovered amounts higher than a predetermined value on each travel route as substitute for the sum of uncovered amounts and the travel route calculation unit 2 may calculate a travel route so as to exclude the travel route, on which the number of uncovered amounts is largest, from candidates for the travel route on which the subject vehicle travels.

DESCRIPTION OF REFERENCE NUMERALS

1 Vehicle information detection unit
2 Travel route calculation unit
3 Information acquisition unit
4 Distance measurement unit
5 Vehicle speed estimation unit
6 Recognition determination unit
7 Avoidance location setting unit
8 Uncovered amount calculation unit

The invention claimed is:

1. A travel route calculation device comprising:
a sensor configured to detect a feature;
a database configured to store feature information of the feature; and
a controller configured to:
measure a necessary recognition distance needed for a subject vehicle to recognize the feature and decide an action for an autonomous drive;
determine a difficulty in recognizing the feature on a basis of the feature information stored in the database, a detection range of the sensor and the necessary recognition distance;
calculate, by using a navigation system, a travel route for the subject vehicle while avoiding a location at which recognition of the feature is determined to be difficult before passing the location at which recognition of the feature is determined to be difficult;
detect the feature located ahead of the subject vehicle on the travel route with the sensor;
decide the action for the autonomous drive based on detection result of the sensor; and
perform control for the autonomous drive based on the action decided.

2. The travel route calculation device according to claim 1, wherein the controller is further configured to determine that recognition of the feature is difficult when a certain feature exists outside the detection range and the certain feature is positioned at a location separate from the subject vehicle by the necessary recognition distance.

3. The travel route calculation device according to claim 1, wherein the controller is further configured to:
estimate a vehicle speed of the subject vehicle; and
measure the necessary recognition distance on a basis of the vehicle speed.

4. The travel route calculation device according to claim 3, wherein the controller is further configured to estimate a legal speed of the travel route as the vehicle speed.

5. The travel route calculation device according to claim 3, wherein the controller is further configured to estimate the vehicle speed when traveling on a certain road of the travel route on a basis of the vehicle speed when having traveled the certain road in a past time.

6. The travel route calculation device according to claim 1, wherein the detection range is set in accordance with a typical value of the feature detection unit.

7. The travel route calculation device according to claim 1, wherein the detection range is set in accordance with a crowded state of the travel route.

8. The travel route calculation device according to claim 1, wherein the controller is further configured to measure the necessary recognition distance on a basis of behavior of the subject vehicle.

9. The travel route calculation device according to claim 1, wherein the controller is further configured to:
calculate an uncovered amount of the necessary recognition distance extending beyond the detection range; and
determine the difficulty in recognizing the feature, on a basis of the uncovered amount.

10. The travel route calculation device according to claim 9, wherein the controller is further configured to calculate the uncovered amount on a basis of a decelerated amount of a vehicle speed of the subject vehicle.

11. The travel route calculation device according to claim 9, wherein the controller is further configured to:

calculate the uncovered amounts on each of a plurality of travel routes at each location of the feature on the travel routes; and exclude a travel route of the plurality of travel routes from candidates for the travel route on which the subject vehicle travels, wherein the excluded travel route is a travel route on which a sum of the uncovered amounts is highest or a travel route on which a number of the uncovered amounts higher than a predetermined value is largest.

12. The travel route calculation device according to claim 1, wherein the controller is further configured to detect the feature using the database that stores information on features.

13. The travel route calculation device according to claim 1, wherein the feature represents traffic rules.

14. The travel route calculation device according to claim 1, wherein the controller is further configured to determine that the recognition of the feature is difficult when the necessary recognition distance is larger than the detection range of the sensor, and determines that the recognition of the feature is possible when the necessary recognition distance is not larger than the detection range of the sensor.

15. A method of calculating a travel route in autonomous driving of a subject vehicle, executed by a controller, comprising:

acquiring, from a database, a feature information of a feature;

measuring a necessary recognition distance needed for the subject vehicle to recognize the feature and decide the action for autonomous drive;

determining difficulty in recognizing the feature, on a basis of the feature information stored in the database, a detection range detectable by the sensor and the necessary recognition distance;

calculating, by using a navigation system, a travel route for a subject vehicle while avoiding a location at which recognition of the feature is determined to be difficult before passing the location at which recognition of the feature is determined to be difficult;

detecting the feature located ahead of the subject vehicle on the travel route with a sensor;

deciding the action for an autonomous drive on a basis of detection result detected with the sensor; and performing control for the autonomous drive on a basis of the action decided.

* * * * *